(12) United States Patent
Zhang et al.

(10) Patent No.: US 8,157,512 B2
(45) Date of Patent: Apr. 17, 2012

(54) HEAT PIPE INTERCOOLER FOR A TURBOMACHINE

(75) Inventors: Hua Zhang, Greer, SC (US); Jatila Ranasinghe, Simpsonville, SC (US); David Wesley Ball, Jr., Easley, SC (US)

(73) Assignee: General Electric Company, Schenectady, NY (US)

( * ) Notice: Subject to any disclaimer, the term of this patent is extended or adjusted under 35 U.S.C. 154(b) by 908 days.

(21) Appl. No.: 12/181,756

(22) Filed: Jul. 29, 2008

(65) Prior Publication Data

US 2010/0028140 A1 Feb. 4, 2010

(51) Int. Cl.
*F01D 17/00* (2006.01)

(52) U.S. Cl. .......... 415/175; 415/1; 165/104.13; 60/728

(58) Field of Classification Search .......... 415/175–179, 415/1; 165/104.13, 104.14, 104.21; 60/728
See application file for complete search history.

(56) References Cited

U.S. PATENT DOCUMENTS

| | | |
|---|---|---|
| 3,517,730 A | 6/1970 | Wyatt |
| 3,722,797 A | 3/1973 | Hammill |
| 3,852,805 A | 12/1974 | Brzozowski |
| 4,033,406 A | 7/1977 | Basiulis |
| 4,036,290 A | 7/1977 | Kelly |
| 4,149,588 A | 4/1979 | Waters |
| 4,226,282 A | 10/1980 | Kunsagi et al. |
| 4,234,782 A | 11/1980 | Barabas et al. |
| 4,280,554 A * | 7/1981 | Stockman ............. 165/11.1 |
| 4,372,110 A | 2/1983 | Fletcher et al. |
| 4,426,959 A | 1/1984 | McCurley |
| 4,621,681 A | 11/1986 | Grover |
| 4,932,204 A | 6/1990 | Pavel et al. |
| 5,233,934 A | 8/1993 | Krigmont et al. |
| 5,237,939 A | 8/1993 | Spokoyny et al. |
| 5,311,930 A | 5/1994 | Bruenn |
| 5,632,143 A | 5/1997 | Fisher et al. |
| 5,918,555 A | 7/1999 | Winegar |
| 6,041,588 A | 3/2000 | Bruckner et al. |
| 6,065,280 A | 5/2000 | Ranasinghe et al. |
| 6,132,823 A | 10/2000 | Qu |
| 6,241,009 B1 | 6/2001 | Rush |
| 6,397,575 B2 | 6/2002 | Tomlinson et al. |
| 6,782,703 B2 | 8/2004 | Dovali-Solis |
| 6,866,092 B1 * | 3/2005 | Molivadas ............. 165/104.21 |
| 6,874,322 B2 | 4/2005 | Schwarzott |

(Continued)

FOREIGN PATENT DOCUMENTS

DE 294483 4/1915

(Continued)

OTHER PUBLICATIONS

EP Search Report for EP Application No. EP09173330. Dated Nov. 25, 2010.

(Continued)

*Primary Examiner* — Gary F. Paumen
(74) *Attorney, Agent, or Firm* — Cantor Colburn LLP

(57) ABSTRACT

A turbomachine includes a compressor having an intake portion and an outlet portion. The compressor compresses air received at the intake portion to form a compressed airflow that is passed from the outlet portion. The turbomachine also includes an intercooler operatively connected downstream from the compressor. The intercooler includes a plurality of heat pipes that are configured to extract heat from the compressed airflow.

20 Claims, 1 Drawing Sheet

U.S. PATENT DOCUMENTS

| | | | |
|---|---|---|---|
| 6,916,430 B1 | 7/2005 | Qu | |
| 6,962,051 B2 | 11/2005 | Radcliff | |
| 7,069,716 B1 | 7/2006 | Childers | |
| 7,131,294 B2 * | 11/2006 | Manole | 62/513 |
| 7,382,047 B2 | 6/2008 | Chen et al. | |
| 7,621,720 B2 * | 11/2009 | Nies | 416/1 |
| 7,730,727 B2 | 6/2010 | Yuan et al. | |
| 2003/0182944 A1 * | 10/2003 | Hoffman et al. | 60/772 |
| 2004/0045294 A1 | 3/2004 | Kobayashi et al. | |
| 2006/0083626 A1 * | 4/2006 | Manole | 417/245 |
| 2006/0231235 A1 | 10/2006 | Yamanaka et al. | |
| 2007/0017207 A1 | 1/2007 | Smith et al. | |
| 2007/0068167 A1 | 3/2007 | Patel et al. | |
| 2007/0074515 A1 * | 4/2007 | Yoshino | 60/670 |
| 2007/0234704 A1 * | 10/2007 | Moniz et al. | 60/39.093 |
| 2008/0115923 A1 | 5/2008 | Yamanaka et al. | |
| 2008/0164009 A1 | 7/2008 | Chong | |
| 2008/0290567 A1 * | 11/2008 | Thillen et al. | 266/176 |
| 2008/0304954 A1 * | 12/2008 | Hoffman et al. | 415/17 |
| 2010/0024382 A1 | 2/2010 | Zhang et al. | |
| 2010/0089062 A1 * | 4/2010 | Cao | 60/682 |

FOREIGN PATENT DOCUMENTS

| | | |
|---|---|---|
| EP | 0794401 A3 | 9/1997 |
| GB | 2099126 A | 12/1982 |

OTHER PUBLICATIONS

Hua Zhang; "Heat Pipe for Removing Thermal Energy From Exhaust Gas"; U.S. Appl. No. 12/175,966, filed Jul. 18, 2008.

Hua Zhang et al.; "Combined Cycle Power Plant"; filed Oct. 17, 2008 as U.S. Appl. No. 12/253,435.

Hua Zhang et al.; "Condenser for a Combined Cycle Power Plant"; filed Jul. 29, 2008 as U.S. Appl. No. 12/181,741.

Hua Zhang et al.; "Apparatus, System and Method for Heating Fuel Gas Using Gas Turbine Exhaust"; filed Jul. 29, 2008 as U.S. Appl. No. 12/181,715.

EP Search Report for Application No. EP 09 16 5813; Search Report dated Nov. 18, 2009.

* cited by examiner

HEAT PIPE INTERCOOLER FOR A TURBOMACHINE

BACKGROUND OF THE INVENTION

Exemplary embodiments of the present invention relate to the art of turbomachines and, more particularly, to a heat pipe intercooler for a turbomachine.

Turbomachines include a compressor operatively connected to a turbine that, in turn, drives another machine such as, a generator. The compressor compresses an incoming airflow that is delivered to a combustor to mix with fuel and be ignited to form high temperature, high pressure combustion products. The high temperature, high pressure combustion products are employed to drive the turbine. In some cases, the compressed airflow leaving the compressor is re-compressed to achieve certain combustion efficiencies. However, recompressing the compressed airflow elevates airflow temperature above desired limits. Accordingly, the prior to being recompressed, the airflow is passed through an intercooler. The intercooler lowers a temperature of the compressed airflow such that, upon recompressing, the temperature of the recompressed airflow is within desired limits.

Conventional intercoolers are large systems requiring considerable infrastructure and capital costs. The intercoolers employ water as a coolant. The water is circulated through a heat exchange member to remove heat from the compressed airflow. The water is then guided through a cooling tower to remove any entrained heat before being re-introduced to the heat exchanger. Employing water as a coolant has several drawbacks. Water has a limited heat carrying capacity, is required in large quantities, and must undergo a costly refining/purifying process before being acceptable for use in the intercooler. The large quantities of water slow thermal response and, as a consequence turbine ramp-up and turn-down. Moreover, existing intercoolers are complicated systems requiring pumps, fans and sophisticated controls.

BRIEF DESCRIPTION OF THE INVENTION

In accordance with an exemplary embodiment of the invention, a turbomachine includes a compressor having an intake portion and an outlet portion. The compressor compresses air received at the intake portion to form a compressed airflow that is passed from the outlet portion. The turbomachine also includes an intercooler operatively connected downstream from the compressor. The intercooler includes a plurality of heat pipes that are configured to extract heat from the compressed airflow.

In accordance with another exemplary embodiment of the invention, a method of extracting heat from a compressed airflow generated by a turbomachine includes passing an airflow to a compressor. The compressor acts on the airflow to create a compressed airflow at a first temperature. The method also includes guiding the compressed airflow at the first temperature from the compressor to an intercooler having a plurality of heat pipes, and passing the compressed airflow over the plurality of heat pipes. The heat pipes absorb heat from the compressed airflow to establish a compressed airflow at a second temperature that is less that the first temperature.

In accordance with yet another exemplary embodiment of the invention, an intercooler operatively connected downstream from a compressor includes a plurality of heat pipes configured to extract heat from a compressed airflow and pass the compressed airflow to the turbine.

Exemplary embodiments of the present invention provide an intercooler that operates to lower a temperature of a compressed airflow without requiring large quantities of water and associated required infrastructure. That is, by using heat pipes having a high heat transfer rate and which require little or no working coolant, the intercooler in accordance with exemplary embodiments of the invention provides a cost effective, reliable and simple system for lowering compressed air temperatures.

DETAILED DESCRIPTION OF THE INVENTION

Figure 1:
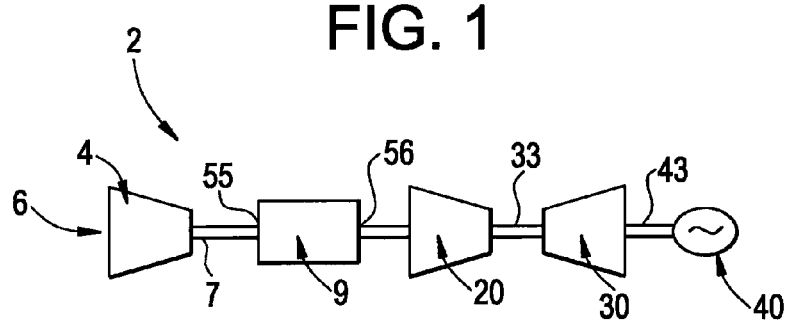
FIG. 1 is a schematic view of a turbomachine system including a heat pipe intercooler in accordance with exemplary embodiments of the invention.

With initial reference to FIG. 1, a turbomachine system in accordance with exemplary embodiments of the invention is indicated generally at 2. Turbomachine system 2 includes a compressor 4 having a compressor intake 6 and a compressor outlet 7. As will be discussed more fully below, compressor outlet 7 is fluidly connected to an intercooler 9. Intercooler 9 is configured to lower a temperature of compressed air passing from compressor 4 prior to introduction to a second compressor 20 which further compresses the air prior to delivery to a combustor (not shown). Compressor 20 is operatively coupled to a turbine 30 via a compressor/turbine shaft 33. In the exemplary embodiment shown, turbine 30 is operatively coupled to a generator 40 via a turbine/generator shaft 43.

Figure 2:
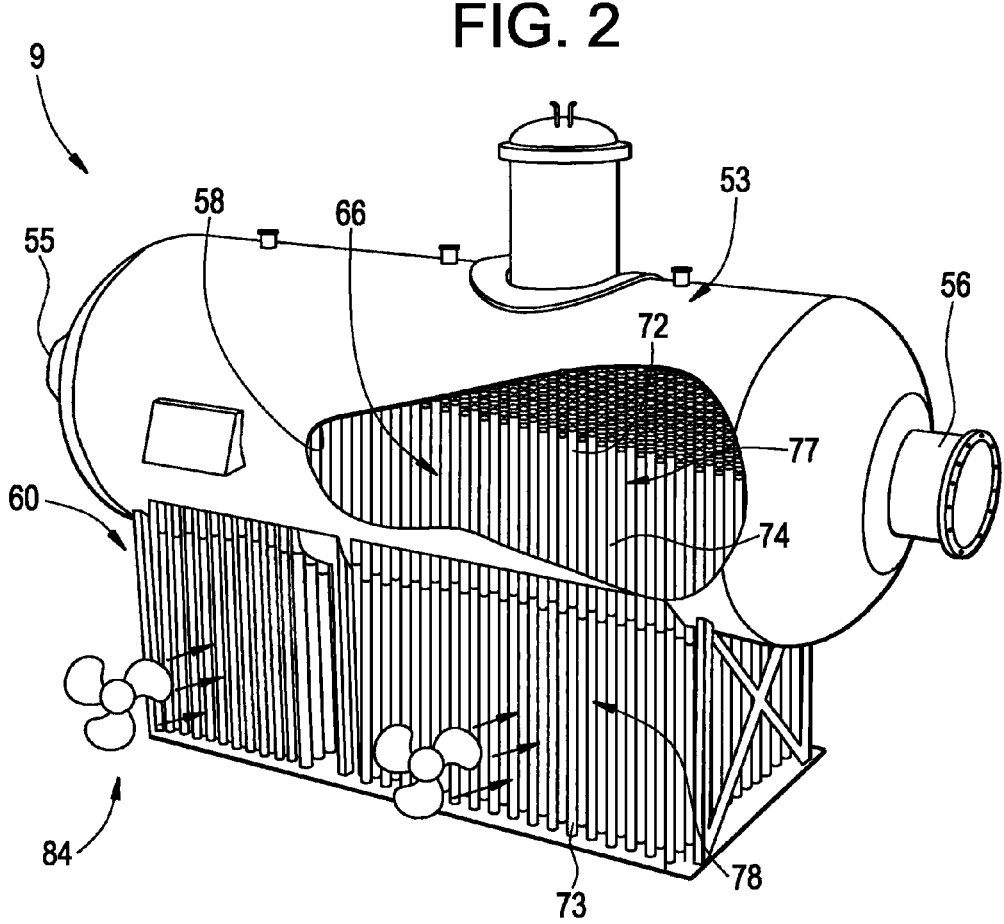
FIG. 2 is a partially cut-away perspective view of the heat pipe intercooler in accordance with exemplary embodiments of the invention.

Reference will now be made to FIG. 2 in describing intercooler 9 constructed in accordance with exemplary embodiments of the intention. As shown, intercooler 9 includes a main body 53 that defines a pressure vessel having an inlet 55, an outlet 56 and an interior chamber 58. Intercooler 9 is shown resting on a support structure 60. In accordance with the exemplary embodiment shown, intercooler 9 includes a plurality of heat pipes, indicated generally at 66, configured to absorb heat from a compressed airflow from compressor 4. At this point it should be understood that the term "heat pipes" should be construed to mean sealed pipes or tubes made of a material having a high thermal conductivity such as, but not limited to, copper, or aluminum. A vacuum pump is used to exclude all fluids (both gases and liquids) from an interior of the seal pipes after which the pipes are filled with a fraction of a percent by volume of a working fluid or coolant such as, but not limited to, water, ethanol, acetone, sodium or mercury. The partial vacuum is near to or below the vapor pressure of the working fluid such that, some of the fluid will be in a liquid phase and some will be in a gas phase.

Each of the plurality of heat pipes includes a first end portion 72, that extends into interior chamber 58, leading to a second end portion 73, arranged outside of the pressure vessel, through an intermediate or heat exchange zone 74. Heat exchange zone 74 actually includes a first heat exchange portion 77, e.g., the portion of each heat pipe 66 located within interior chamber 58, and a second heat exchange portion 78, e.g., the portion of each heat pipe 66 located outside of interior chamber 58. With this arrangement, heat entrained in the compressed air is absorbed by first heat exchange portion 77. The heat is rapidly conducted though intermediate zone 74 to second heat exchange portion 78. A convective airflow generated by, for example, a fan 84, passes across second heat exchange portion 78 to remove the heat.

At this point it should be appreciated that exemplary embodiments of the present invention provide a simple, cost effective system for removing heat from a compressed airflow. The use of heat pipes provides a simple to use, easy to maintain and low cost system that does not require large quantities of water, as a coolant. As such, exemplary embodiments of the invention enable the turbine to respond faster to load changes.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A turbomachine comprising:
    a compressor including an intake portion and an outlet portion, the compressor compressing air received at the intake portion to form a compressed airflow passed from the outlet portion; and
    an intercooler operatively connected downstream of the compressor, the intercooler including a plurality of heat pipes configured to extract heat from the compressed airflow, each of the plurality of heat pipes being sealed, having a partial vacuum, and including a working fluid at least a portion of which is in a liquid phase and another portion of which is in a gas phase.

2. The turbomachine according to claim 1, wherein the intercooler includes a pressure vessel, each of the plurality of heat pipes including a first end portion extending into the pressure vessel and a second end portion projecting out from the pressure vessel.

3. The turbomachine according to claim 2, further comprising: at least one fan directed at the intercooler, the at least one fan directing a forced airflow over the second end portion of each of the plurality of heat pipes.

4. The turbomachine according to claim 1, wherein at least a portion of the plurality of heat pipes are hermetically sealed heat pipes that include a coolant in at least one of a liquid phase and a vapor phase.

5. The turbomachine according to claim 1, wherein each of the plurality of heat pipes includes an external surface and an internal surface, at least a portion of the plurality of heat pipes including a heat conductive coating on the internal surface.

6. The turbomachine according to claim 1, further comprising: another compressor arranged downstream from the intercooler, the another compressor further compressing the compressed airflow passing from the intercooler.

7. The turbomachine according to claim 1, wherein the intercooler does not include water as a coolant.

8. A method of extracting heat from a compressed airflow generated by a turbomachine, the method comprising:
    passing an airflow to a compressor, the compressor acting on the airflow to create a compressed airflow at a first temperature;
    guiding the compressed airflow at the first temperature from the compressor to an intercooler having a plurality of heat pipes, each of the plurality of heat pipes being sealed, having a partial vacuum, and including a working fluid at least a portion of which is in a liquid phase and another portion of which is in a gas phase;
    passing the compressed airflow over the plurality of heat pipes, the heat pipes absorbing heat from the compressed airflow to establish a compressed airflow at a second temperature, the second temperature being less that the first temperature.

9. The method of claim 8, further comprising: passing the compressed airflow into a pressure vessel, each of the plurality of heat pipes including a first end portion extending into the pressure vessel and a second end portion projecting out from the pressure vessel.

10. The method of claim 9, further comprising: passing a convective airflow over the second end portion of each of the plurality of heat pipes.

11. The method of claim 8, further comprising: passing the compressed airflow at the second temperature into a turbine.

12. The method of claim 8, further comprising: passing the compressed airflow at the second temperature to another compressor, the another compressor further compressing the compressed airflow to create a further compressed airflow at a third temperature, the third temperature being higher than the second temperature.

13. The method of claim 12, further comprising: passing the further compressed airflow to a turbine.

14. An intercooler operatively connected downstream from a compressor, the intercooler comprising:
    a plurality of heat pipes configured to extract heat from a compressed airflow and pass the compressed airflow, each of the plurality of heat pipes being sealed, having a partial vacuum, and including a working fluid at least a portion of which is in a liquid phase and another portion of which is in a gas phase.

15. The intercooler according to claim 14, wherein the intercooler includes a pressure vessel, each of the plurality of heat pipes including a first end portion extending into the pressure vessel that leads to a second end portion projecting out from the pressure vessel.

16. The intercooler according to claim 15, further comprising: at least on fan directed at the intercooler, the at least one fan directing a forced airflow over the second end portion of each of the plurality of heat pipes.

17. The intercooler according to claim 14, wherein at least a portion of the plurality of heat pipes are hermetically sealed heat pipes that include a coolant in at least one of a liquid phase and a vapor phase.

18. The intercooler according to claim 14, wherein each of the plurality of heat pipes includes an external surface and an internal surface, at least a portion of the plurality of heat pipes include a heat conductive coating on the internal surface.

19. The intercooler according to claim 14, wherein the intercooler does not include water as a coolant.

20. The intercooler according to claim 14, wherein the intercooler is fluidly connected to a turbine.

* * * * *